United States Patent [19]

May

[11] 4,340,411
[45] Jul. 20, 1982

[54] FLOAT GLASS FORMING CHAMBER WITH AUXILIARY HEATING MODULES

[75] Inventor: Earl L. May, Irwin, Pa.

[73] Assignee: PPG Industries, Inc., Pittsburgh, Pa.

[21] Appl. No.: 222,398

[22] Filed: Jan. 5, 1981

[51] Int. Cl.³ .............................................. C03B 18/22
[52] U.S. Cl. ................................. 65/182.3; 65/182.1; 65/182.5; 110/332
[58] Field of Search ................. 65/182.1, 182.3, 182.5, 65/346; 110/332

[56] References Cited
U.S. PATENT DOCUMENTS

| | | | |
|---|---|---|---|
| 3,486,869 | 12/1969 | Alonzo et al. | 65/27 |
| 3,486,876 | 12/1969 | Augustin et al. | 65/182.1 X |
| 3,575,694 | 4/1971 | Bigliardi, Jr. et al. | 65/63 |
| 3,976,460 | 8/1976 | Kompare et al. | 65/99.4 X |

Primary Examiner—Arthur D. Kellogg
Attorney, Agent, or Firm—Dennis G. Millman

[57] ABSTRACT

Auxiliary heat is provided to a float glass forming chamber by means of a prewired portable heating module which may be inserted or removed from an operating forming chamber. In particular, the auxiliary heating arrangement is adapted to provide temporary center heat in a forming chamber which is primarily heated along side portions.

10 Claims, 4 Drawing Figures

FLOAT GLASS FORMING CHAMBER WITH AUXILIARY HEATING MODULES

BACKGROUND OF THE INVENTION

In the float process for forming flat glass, molten glass is drawn from a melting furnace and passed to a forming chamber (or "float bath") where the molten glass is deposited onto an elongated pool of molten metal such as tin or copper or alloys thereof. There, a ribbon of glass is stretched to the desired thickness as it progresses along the elongated pool of molten metal and is then withdrawn from the forming chamber as a continuous ribbon at the exit end of the forming chamber. Because of the fluid support provided by the molten metal to the glass, glass of superior optical quality can be produced by the float process.

The roof of the float forming chamber commonly in use comprises a complex grid of relatively small ceramic pieces interlocked with one another and suspended from above by a large number of metallic rods. The design includes a large number of vertically extending electrical heating units supported within openings in the grid. Other openings in the grid are filled with blind plugs. The result is an interior roof surface which is non-planar and has a relatively large surface area and a large number of joints and vertically extending cracks and surfaces. Such a complex roof structure encourages condensation and dripping of volatilization products. The large number of crevices permits ingress of cooler exterior atmosphere which promotes condensation. The nonplanar surfaces tend to increase running and coalescing of condensation products. More recent designs of float bath roofs have simplified the support grid design so as to extend across the float chamber in only the transverse direction for the sake of simplified construction. However, the revised design still possesses the drawbacks of a large number of joints and non-planar interior surfaces.

The conventional float forming chamber entails a maze of bus bars and leads above the roof to connect the electrical heating elements to a power source. The entire electrical connection arrangement is enclosed within a large chamber known as the upper plenum, within which a controlled atmosphere is usually maintained to cool and prevent oxidation of the electrical connectors. Unfortunately, such an arrangement renders access to the heating elements and their connections extremely difficult during operation of the float chamber due to the high temperatures and closely spaced electrical conductors. It is desired occasionally to disconnect or remove a heating element to alter the heating pattern or to replace a damaged element, but because of the difficult access in prior art float chamber designs, such modifications or repairs were carried out during operation in only the most dire circumstances. Usually, the modifications or repairs were postponed until a major shut-down of the operation. Furthermore, when access was attempted during operation, a major upset of the glass forming process could result, since it was required to turn off the heat in a substantial portion of the forming chamber. Therefore, there has been a need for a more versatile heater arrangement for float forming chambers.

These problems have been alleviated considerably by the float glass forming chamber disclosed in U.S. application Ser. No. 195,283 filed on Oct. 8, 1980, by Ronald L. Schwenninger entitled "FLOAT GLASS FORMING CHAMBER WITH HORIZONTAL HEATING ELEMENTS," wherein electrical heating elements extend horizontally through side walls of the forming chamber. A variation of such a forming chamber is disclosed in U.S. patent application Ser. No. 222,396 filed on even date herewith by Earl L. May entitled "FLOAT GLASS FORMING CHAMBER WITH EXTERNALLY SUPPORTED ROOF." The horizontal heating element arrangement of these applications advantageously reduces the complexity of the roof structure by eliminating heating elements from the roof. Additionally, deploying the heating elements along side portions of the forming chamber advantageously directs heat to the portions of the forming chamber where it is most needed. However, the need arises occasionally to provide heat along the center line of the forming chamber, especially during heat-up from a cold state. Special operating situations may also render it desirable from time to time to temporarily provide center heat in the forming chamber. Therefore, in a forming chamber wherein the primary heating zones are along the sides of the forming chamber, it would be desirable to provide an arrangement for inserting temporary heating elements along the center line of the forming chamber. Such an arrangement should not revert to the complex, virtually inaccessable roof heater arrangements of the prior art, but should provide for flexibility to add or remove auxiliary heating elements during continuous operation of the forming chamber.

SUMMARY OF THE INVENTION

In the present invention a float glass forming chamber is provided with modular, prewired, auxiliary heating means. The auxiliary heating means comprises a plurality of electrical resistance heating elements carried on a unitary base on which are provided self-contained electrical connection means. In the preferred embodiment the electrical connection means comprise bus bars carried on each module to which the heating elements on the module are attached. Because of this arrangement, the electrical connections to the heating elements can be prewired before they are set into place in the forming chamber, thereby eliminating the need for access to the enclosed space above the forming chamber during installation. Instead, each prewired heating module may simply be lowered into place through an access opening without disrupting operation of the float forming chamber. Likewise, the heated modules of the present invention may be removed or relocated readily during operation.

The heating modules of the present invention may be inserted into any float glass forming chamber where supplemental heat is needed, but they are particularly adaptable to providing supplemental center heat in the type of forming chamber whose primary heating zones are along the sides of the chamber. In the latter case, a plurality of the heating modules are preferably inserted into a longitudinally extending slot in the chamber roof along the centerline of the chamber.

THE DRAWINGS

DETAILED DESCRIPTION

Figure 1:
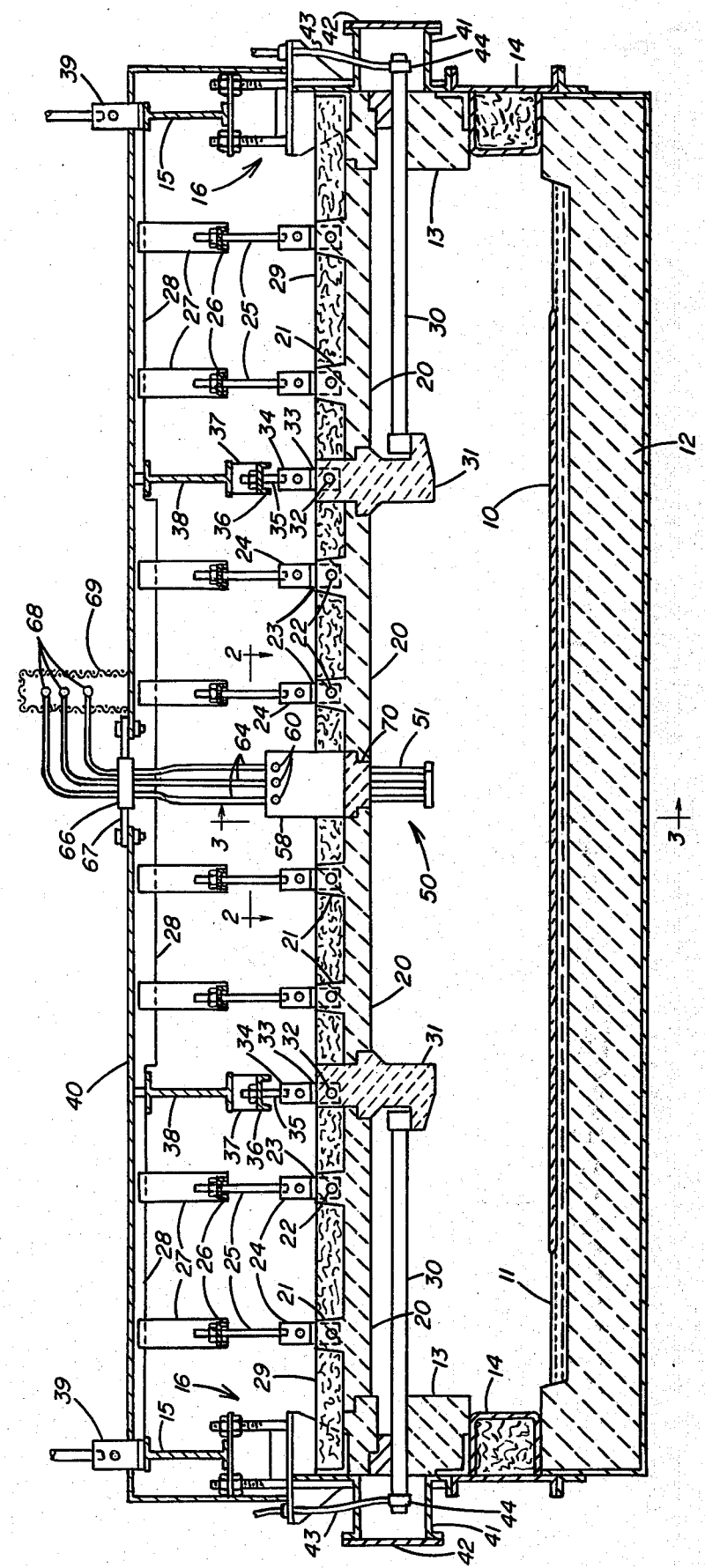
FIG. 1 is a transverse cross-sectional view of a preferred embodiment of a float glass forming chamber incorporating the center heating modules of the present invention.

In FIG. 1 there is shown in cross section an example of a float glass forming chamber embodiment in which the present invention is particularly useful. However, it should be understood that the heating modules of the present invention are not limited to use in the particular type of forming chamber illustrated. The heating modules will find utility wherever it is desired to provide temporary heating in a forming chamber with limited access. Also, it should be understood that the structure depicted in FIG. 1 may be characteristic of only a portion of the length of a forming chamber.

In FIG. 1 a softened ribbon of glass 10 is shown floating on a pool of molten metal 11 (usually tin, although copper or mixtures of tin and copper may also be employed). Minor amounts of other metals such as iron may also be included in the molten metal bath. As viewed in FIG. 1, the ribbon of glass 10 is traveling in a direction normal to the plane of the page. The molten metal 11 is contained within a refractory basin 12. Suspended along the sides of the basin 12 are refractory side walls 13 so as to provide a substantially continuous slot along the sides of the forming chamber for insertion of glass stretching equipment and other devices. The side slots may be closed by means of side seals 14. Support for the side walls 13 may be provided by main beams 15 by way of bracket assemblies 16.

In the preferred embodiment depicted, the major components of the forming chamber roof are refractory slabs 20, from the top of which project ribs 21. Support of the slabs 20 is effected by means of horizontally extending girder rods or pipes 22 within the ribs 21. The girder means 21 are engaged by hanger plates 23 pinned to clevises 24 which, in turn, are affixed to the lower ends of vertically extending hanger rods 25. The hanger rods 25 may be supported at their upper ends by horizontally extending stringer beams 26 which are hung by means of brackets 27 from cross beams 28.

The insulating value of the roof may be increased by applying a layer of insulating material 29 over the refractory roof slabs 20. The insulating material may be a high-temperature mineral wool blanket.

In the FIG. 1 embodiment, electrical resistance heating elements 30 advantageously extend into the forming chamber through the side walls 13. The heating elements 30 may be of the well-known three-legged type adapted for use with three-phase alternating current. In at least some zones of the forming chamber the heating elements 30 may be spaced apart at close intervals along both sides of the forming chamber. The inner end of each heating element 30 is supported by a refractory heater hanger element 31, which is supported in a manner similar to that of the slabs 20. The hanger elements 31 include a horizontally extending girder member 32 which is engaged by hanger plates 33 suspended from clevises 34 which are affixed to the ends of rods 35. The rods 35 extend downwardly from horizontally extending stringers 36 which are affixed to main roof support beams 38 by means of bracket plates 37. The main roof support beams 15 and 38 are supported from the overhead structure (not shown) by means of clevis devices 39. The entire roof supporting structure may be enclosed within a sheet metal casing 40 so as to render the roof of the forming chamber essentially gas-tight.

The outer end of each heating element 30 may be enclosed by a gas-tight housing 41 provided with an access cover 42. Electrical leads 43 pass through the housing and are affixed to each leg of the heating elements 30 by means of clamps 44 within each housing.

Figure 2:
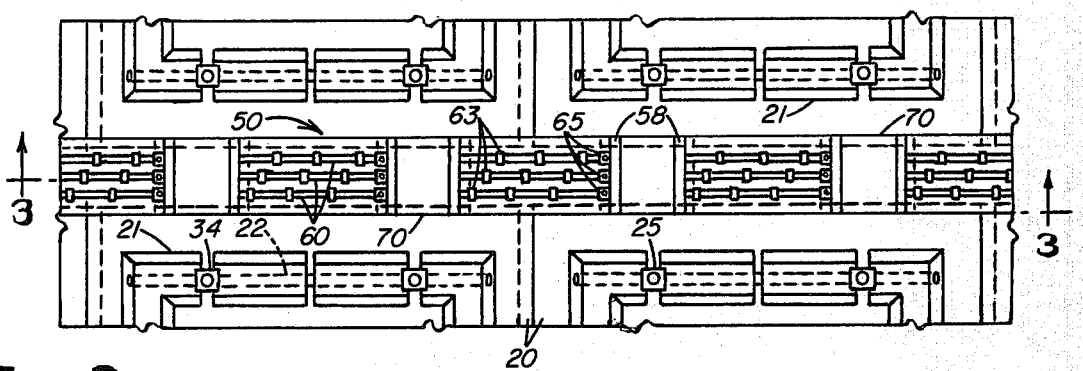
FIG. 2 is a plan view of a center portion of the roof of the float forming chamber of FIG. 1 taken along line 2—2 in FIG. 1.
Figure 3:
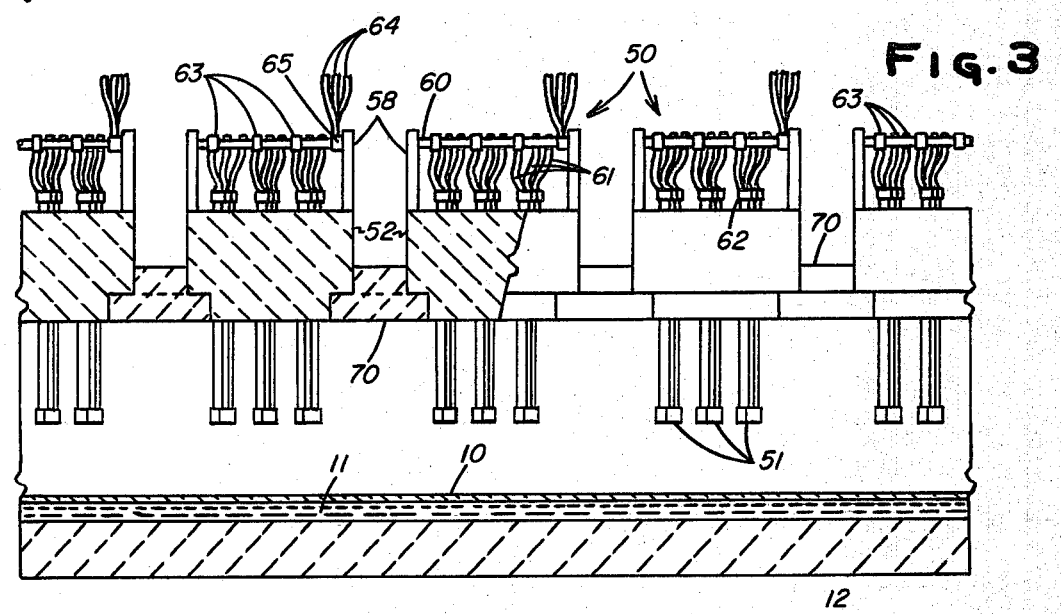
FIG. 3 is a longitudinal cross-sectional view of the float forming chamber of FIG. 1 taken along line 3—3 in FIG. 1 and FIG. 2.

As shown in FIG. 1, the heating modules 50 of the present invention may be inserted in an opening at the center of the forming chamber. Referring now to FIGS. 2 and 3, the opening may be an elongated slot along the centerline of the forming chamber and may receive a plurality of the heating modules 50. Each module 50 carries several heating elements 51 which likewise are of the elongated, three-legged, electrical resistance type and which extend through a base block 52 of refractory material (FIG. 3). As shown in the enlarged view of FIG. 4, the base block 52 may be a composite of several refractory pieces such as a layer of high temperature resistant insulation board 53 on the underside, a block of highsilica insulation brick 54 in the center, and a layer of an inorganic millboard 56 on top, all secured together by means of stainless steel tie rods 57. The module is shown with three heating elements 52, which can be accommodated in a conveniently sized module, but a greater or smaller number of heating elements may be carried by a module.

The heating elements 52 are connected to common electrical connection means, i.e., there is a single terminal on each module for each phase of electric current (typically three) and each terminal is connected electrically with one leg of each heating element. A convenient arrangement for connecting the terminals to the legs of the heating elements is by means of a set of short bus bars or the like.

Figure 4:
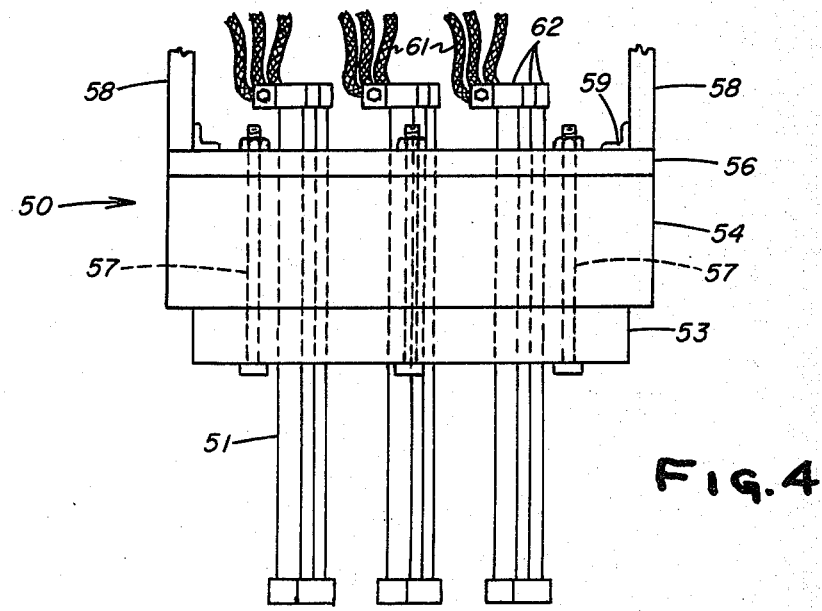
FIG. 4 is an enlarged side view of a preferred embodiment of center heating module showing details of the lower portion thereof.

At each end of a module 50 a vertically extending standard 58 is affixed to the base by means of an angle iron 59 (FIG. 4). The standard 58 may be of an inorganic millboard material. The attachment may be made by means of screws. As may be seen in FIGS. 2 and 3, each pair of standards 58 supports bus bars 60, which are typically three in number due to the use of three-phase current. Electrical connection between the heating elements 51 and the bus bars 60 is made by means of leads 61 affixed to the upper ends of each heating element leg by means of clamps 62 and to the bus bars by means of clamps 63. Supply cables 64 connected to each bus bar by means of clamps 65 connect the bus bars to a source of electrical power. As may be seen in FIG. 1, the supply cables 65 may pass out of the roof enclosure through an insulator insert 66 carried on an access door 67 in the casing 40. The supply cables are connected to trunk cables 68 which lead to a power supply substation. The trunk cables 68 may be enclosed within a mesh housing 69 for the sake of safety.

As shown in the drawings, it is preferred that each heating module 50 be provided with overhanging shoulders so as to form a shiplap joint with adjacent refractory roof pieces, thereby providing support for the modules and a more tightly sealed joint for containing the forming chamber atmosphere. When the module base is formed of a composite sandwich as shown in FIG. 4, the shoulders may be created by employing a bottom layer 53 of smaller dimensions than the upper layers. As can be seen in FIG. 1, the edges of the roof slabs 20 facing the modules 50 are rabbeted to receive the shoulders of the modules. Refractory fillers 70 may be inserted between modules, and the fillers 70 likewise rest on the rabbeted edges of the adjacent roof slabs 20 and also form shiplap joints with adjacent modules.

From the foregoing description, it should be apparent that each module 50 may be assembled outside the forming chamber by installing the heating elements 51 and connecting them to the bus bars 60. With the supply cable 64 connected to the bus bars, a preassembled module may be installed simply by lowering the module through the opened access door 67 and brought to rest in the center opening between the refractory roof slabs 20. Accordingly, the only on-site connections which must be made are to connect the supply cable 64 to the trunk lines 68 which advantageously are located outside the confined high-temperature environment within the casing 40 and thus are readily accessable. When it is desired to discontinue heating at the center location, the supply cables 64 may merely be disconnected from the trunk lines 68, or the module may also be removed from the roof enclosure. When a module has been removed, a refractory dummy piece (not shown) may be inserted in place thereof to fill the opening.

A specific preferred embodiment has been described in detail for the sake of illustrating the invention and for disclosing the best mode, but it should be understood that other variations and modifications as are known to those of skill in the art may be resorted to without departing from the scope of the invention as defined by the claims which follow.

I claim:

1. Apparatus for forming flat glass by the float process comprising an enclosure adapted to hold a pool of molten metal, means for delivering a stream of molten glass onto the molten metal, means for drawing the glass along the pool of molten metal so as to form the glass into a ribbon, primary heating means within the enclosure, the improvement comprising: an opening in the enclosure for receiving auxiliary heating means, auxiliary heating means including a unitary refractory base configured to serve as a portable closure for said opening, a plurality of elongated electrical resistance heating elements insulated from each other and extending through the refractory base and into the enclosure, a common electrical connection point carried on the base, and electrical conductor means joining each of the heating elements to the common electrical connection point whereby the auxiliary heating means may be inserted into the enclosure as a prewired module.

2. The apparatus of claim 1 including a plurality of said auxiliary heating means extending through the roof structure of the enclosure along the longitudinal centerline thereof.

3. The apparatus of claim 2 wherein the electrical resistance heating elements of the auxiliary heating means extend vertically through the respective refractory base.

4. The apparatus of claim 1 or 2 wherein said primary heating means are comprised of elongated electrical resistance heating elements extending horizontally over side portions of the molten metal pool.

5. The apparatus of claim 1 wherein said common electrical connection point comprises a bus bar carried on the refractory base and the electrical conductor means comprise electrical leads connecting the bus bar to each of the heating elements on the respective refractory base.

6. The apparatus of claim 5 wherein the bus bars are supported above the refractory base on upstanding support members affixed to the refractory base.

7. The apparatus of claim 5 or 6 wherein an electrical supply cable is connected to each of the bus bars.

8. The apparatus of claim 1 wherein the enclosure includes a roof comprised of refractory slabs, and the auxiliary heating means rest in a gap between adjacent refractory slabs of the roof.

9. The apparatus of claim 8 wherein the roof structure of the enclosure further includes a gas-tight casing above the refractory roof slabs and the casing is provided with an access door above the location of the auxiliary heating means.

10. A portable heating module for insertion into a float glass forming chamber, comprising: a unitary refractory base configured to serve as a closure for an opening in the forming chamber, a plurality of electrical resistance heating elements insulated from each other and extending through the refractory base, a common electrical connection point carried on the base, and electrical conductor means connecting each of the heating elements to the common electrical connection point.

* * * * *